W. D. LEE.
BOLT AND NUT LOCK.
APPLICATION FILED JULY 27, 1917.
1,306,600.
Patented June 10, 1919.
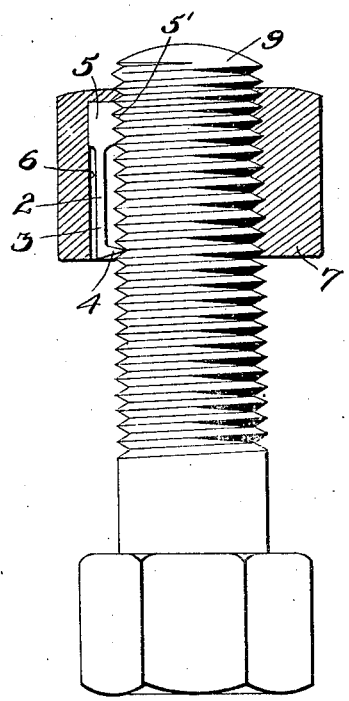
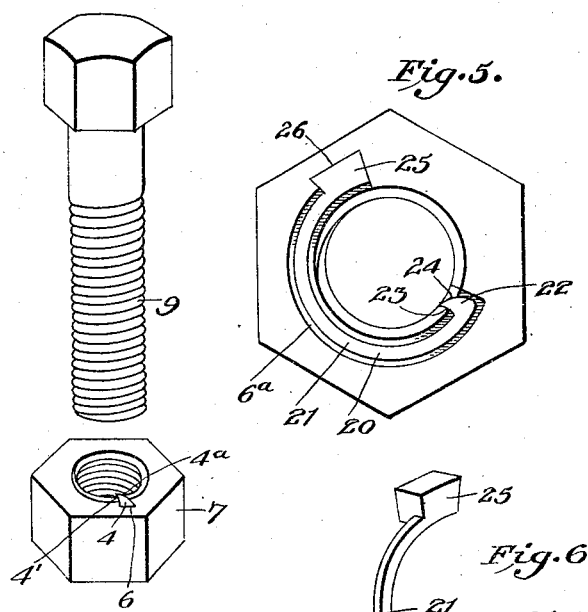
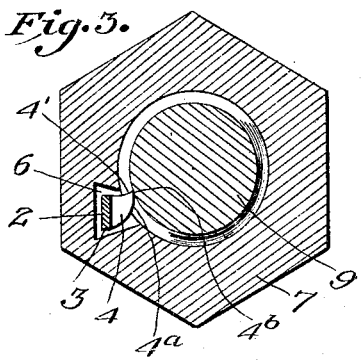
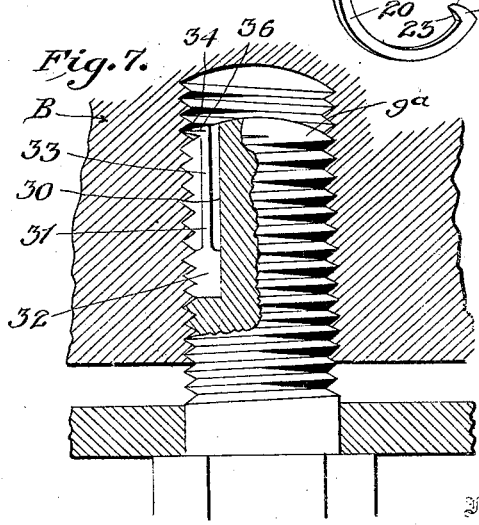
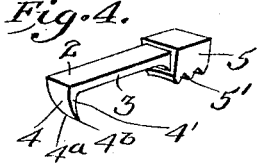
Inventor
William Dudley Lee
Attorney

UNITED STATES PATENT OFFICE.

WILLIAM DUDLEY LEE, OF OAKLAND, CALIFORNIA.

BOLT AND NUT LOCK.

1,306,600.  Specification of Letters Patent.  Patented June 10, 1919.

Application filed July 27, 1917. Serial No. 183,141.

*To all whom it may concern:*

Be it known that I, WILLIAM DUDLEY LEE, a citizen of the United States, residing at Oakland, in the county of Alameda and State of California, have invented certain new and useful Improvements in Bolt and Nut Locks; and I do hereby declare the following to be a full, clear, and exact description of the invention, such as will enable others skilled in the art to which it appertains to make and use the same.

This invention relates to bolt and nut locks and has for an object to provide a simple, practicable, inexpensive and substantial form of device for securing nuts and bolts in respective assembled positions or for securing a cap screw or the like in assembled relation to some other relatively stationary structure. A further object of the present invention is to provide a nut or bolt lock of such construction that a nut may be readily threaded upon the body of the bolt without material resistance by the locking device and which latter is of such construction and so assembled within the nut or screw that the sharp cutting point of the locking member is continually in contact with the body of the bolt or screw and immediately locks the nut and bolt against relative movement owing to vibration of the members and prevents any retrograde movement of the nut or bolt with respect to each other tending to unscrew the parts but permits owing to the resiliency of the bar or shank the separation of these members when so desired by the application of sufficient manual force, as for instance by the means of a wrench which may be applied to the nut or screw to be removed from the complementary member. Another object of the present invention is to provide a nut, screw or bolt lock in which there is employed a key having a resilient portion adapted to cause a locking member of the key to bear upon and bite into the root of the bolt or screw or other member with which the nut or bolt may be desired to be secured for relative adjustment and prevents the accidental or any undesirable separating movement of the parts. It is another object of the present invention to provide an automatic nut or screw lock in which there is formed a key adapted to engage by cutting action the bolt or screw between the threads thereof and which device is fixedly though removably fastened to the nut or bolt so as to permit separation of the complementary members by the yielding movement of the resilient bar or shank, and particularly to provide a device of this character which may be reused a number of times and which if necessary may be renewed when the respective parts have become unduly worn.

With the above and other objects in view as will be rendered manifest in the following specification, the present invention consists of a nut and screw lock consisting of the parts, construction and combination of parts as hereinafter more fully described, and various forms of which are illustrated in the several figures of the drawing and described in the following specification and particularly defined in the annexed claims.

In the drawing:—

Figure 1 is a perspective view of the preferred form of the invention showing a bolt and its nut in dissembled relation;

Fig. 2 is a side elevation of a bolt with the nut applied thereto in transverse section and showing the locking key in elevation;

Fig. 3 is an enlarged detail sectional view through the bolt and the nut and illustrating the relative position of the locking key in operative position;

Fig. 4 is a perspective view of the detached or separated locking key;

Fig. 5 is a face view of a nut showing a modified form of the key inserted therein;

Fig. 6 is a perspective view of the key illustrated in Fig. 5;

Fig. 7 is a plan view of a screw being threaded on a part and in the side of which a locking device is arranged.

It is one of the important objects of the present invention to provide means for locking bolts and screws together or for locking nuts and screws in given relative positions and especially to provide such a device in which the parts may be made inexpensively in quantities and to that end the present invention comprises a form of key 2 having an elongated body or bar portion 3 of suitable proportions and preferably made of highly tempered steel to secure the desired degree of resiliency, the end portion 4 of the key being provided with a sharp convergent curve $4^a$ terminating in a sharp cutting contact point $4^b$ while the opposite end of the body or bar 3 is provided with a stock portion 5 of suitable construction which is adapted to be rigidly secured and removably mounted in the member upon which the key 2 is adapted to be assembled and as shown in Figs. 1 to 4 of the drawing, this key is rigidly secured and removably mounted in a socket or groove 6 arranged longitudinally along the interior surface of the nut 7 and terminating short of the outer end of the nut as at 8 so that the end of the socket 6 is concealed by a wall or shoulder which aids in positioning the hook or engaging portion 4$^b$ of the key is somewhat higher than the apex of the corresponding thread of the nut of which it forms a partial continuation, and thus it is properly positioned between the threads of the body of the bolt or screw 9. The body engaging or hook portion 4 of the key has a substantially radial face 4' and opposite the radial face 4', there is provided a sharp convergent curve 4$^a$ terminating in the sharp cutting contact point 4$^b$ the side faces of said convergent curve 4$^a$ are disposed preferably at an angle to each other less than the angle between the threads of the screw or bolt 9, so that the side faces do not rest upon the faces of the threads in the bolt. The stock end 5 of the key may or may not be provided with a threaded portion 5' which threads would be such as to conform to the threads in the bolt 9 upon which the device may be mounted and the thickness of the body portion or bar 3 of the key is such that it is capable of having yielding movement toward and from the screw 9 space being provided between the outer surface of the bar or shank portion 3 and the adjacent face of the slot 6 in the nut to permit the desired action. The groove or channel 6 for the key is shown in Fig. 3 as being arranged to one side of a diametrical line through the nut so that the transverse plane of the body of the shank 3 is arranged tangentially to the circle of the bolt and that edge of the locking member 4 which is opposite to the front edge 4' is as is indicated at 4$^a$ formed on a curve extending from one side of the bar 3 downwardly and terminating in the sharp cutting point 4$^b$ and therefore when the nut 7 is threaded upon the bolt 9, the hook 4 which preferably is disposed within the end face of the nut 7 as shown in Fig. 2 will freely ride into engagement with the body of the bolt or screw between the first threads and thereafter continue to ride between the threads thereof permitting the nut or the screw to be turned into assembled position without material resistance. The stock portion 5 of the locking device is so mounted in the slot or groove 6 within the nut that upon interruption of the relative turning movement during the assembling of the nut on the bolt, the hook or point portion 4 will owing to its being pressed inwardly through the resiliency of the bar or shank 3, firmly bite into the root of the thread, and thus effectively prevents loosening or unscrewing movement of the bolt relative to the nut after these are moved to the desired position.

While the key will thus operate to maintain the parts in relative assembled position yet when it is desired to remove the nut from the bolt or screw, it is only necessary to provide sufficient power or force to turn the nut against the resistance encountered by the cutting action of the point 4 upon the body of the bolt, and when this is overcome the nut can be readily turned off the screw. The bolt being of softer material than the cutting point 4$^b$ of the locking member 4 of the key there is a tendency of said point to cut a slight portion from the surface of the body of the bolt and when after considerable action the point 4 of the key has worn down the body of the bolt then the beveled sides 4$^a$ of the key point will take effect and bear at the root of the thread without causing any material wear upon the point of the thread, and thus permitting the bolt to be used indefinitely. Obviously, the inner surface of the shank or bar 3 of the key is spaced above the roots of the threads in the nut 7 so that at no time during the assembling of the nut upon the shank of the screw will the body of the key rest upon the threads of the bolt or screw.

In Figs. 5 and 6 of the drawing, there is illustrated a slight modification of the invention in which the key 20 has a resilient arcuate shank 21 with a locking member 22 having a substantially radial face 23 opposed to a sharp convergent curve 24 terminating in a sharp cutting contact point 4$^b$, as shown in Fig. 4, and when mounted in a nut, as shown in Fig. 5, the contact point 4$^b$ forms a partial continuation of the corresponding thread of the nut, and is adapted to ride on the body of the bolt or screw when the nut is being assembled upon a threaded member. The opposite end of the shank of the key in this form is provided with a stock portion 25 shown as dove-tailed in plan view adapted to fit a complementary recess 26 formed in the nut 7 which is also provided with an arcuate chamber or counter-sunk portion 6$^a$ to receive the shank 21 of the key and permit automatic action as the nut is being screwed upon the threaded shank of the bolt, but when the nut is to be unscrewed, then the sharp cutting contact point 4$^b$ of the locking member 22 firmly engages by cutting action the shank or body of the screw and resists removal of the nut to a degrees which is determined by the strength of the spring formed by the shank 21, but this resistance may be readily overcome by sufficient manual force applied to the nut or screw with a wrench, thereby permitting the nut to be removed substantially in the same manner as an ordinary nut is removed from a bolt.

The principle of this invention is further embodied in a form illustrated in Fig. 7 in which a screw 9ᵃ is provided with a slot or socket 30 in the end of the threaded portion of the screw in which there is mounted a key 31 having a stock end 32 fixedly driven into the recess or socket 30 the key also having a resilient bar or shank portion 33 at the end of which is provided a locking member 34 having a face 35 approximately radial to the center of the screw 9ᵃ. Opposite the edge of the locking member 34 of the key, there is formed a sharp convergent curve 36 terminating in the sharp cutting contact point 4ᵇ as shown in Fig. 4, and which locking member 34 of the key is adapted to ride on the adjacent body of the screw portion B when being turned onto a threaded portion. The point 34 is adapted to bite into the adjacent surface of the portion B. In action in this modification of the invention, as soon as the point 34 of the key engages the portion B, the resistance of the latter causes the key to swing slightly, and while the screw 9ᵃ may be turned in the direction of the arrow after this point has engaged the surface of the portion B accidental unscrewing of the screw 9ᵃ from the threaded portion B is resisted by the action of the key hook. As above described with relation to the other modification of the invention owing to the resiliency of the bar or shank 33, the resistance of the contact point 4ᵇ of the locking member 34 of the key to unscrewing movement may be overcome by the application of a wrench with sufficient manual force to the head of the cap screw, thus permitting separation of the complementary members in the same manner as an ordinary cap screw is removed from a complementary member.

From the foregoing it will be seen that the nut or screw in each instance is provided with a cavity or recess to receive the key corresponding thereto and that the key is rigidly fastened in the part and is adapted to yield and has a sharp cutting contact point which is capable of engaging by cutting action the body of an adjacent screw member for the purpose of preventing the accidental rotation of the part, but owing to the yielding movement of the bar or shank of the key, the removal of the nut from the bolt is accomplished substantially in the same manner as an ordinary nut is removed from a bolt, when a wrench is applied to the nut or screw with sufficient manual force, and it will be seen also that the socket in the nut or screw may be formed therein by the same method or process and at the same time that the nut or screw is made thus providing an economical construction. The keys are simple, easily manufactured and may be removed and changed when necessary, and moreover by the construction of the key and the part therefor, these parts when once assembled cannot be readily separated and therefore not easily lost.

Obviously various changes in the details of construction of the parts and their sizes and proportions and in other details may be resorted to without departing from the spirit of the present invention within the scope of the appended claims.

What is claimed as new is:—

1. In a device for locking nuts or bolts, a flexible key having a stock portion mounted in the nut or bolt, and having a locking member in the line of its thread adapted to yieldingly engage the body surface between the threads of a complementary part and permit easily relative movement in one direction and cut into the body surface to lock the parts normally against opposite or separating movement but permitting the parts to be separated upon application of sufficient force to overcome the cutting resistance without destroying the threads.

2. In a device for locking nuts or bolts, a flexible key having a stock portion at one end rigidly mounted in the nut or bolt, the shank of the key lying in a slot or groove and having a locking member in the line of the thread interrupted by the slot and adapted to engage a contiguous surface of the complementary member and permit easily relative movement in one direction and to engage with cutting action the surface to lock the parts normally against opposite movement by vibration but permitting the parts to be separated upon application of sufficient force in the usual manner to overcome the cutting resistance, the point of the locking member having a cutting effect on separating movement of the nut or bolt.

3. Means for locking male and female threaded parts, in which one part is provided with a recess or groove which at one point interrupts its thread, and a resilient shank, disposed in the recess, rigidly secured at one end to said part and having at its other end a locking portion the body of which lies parallel to the threads and occupies the space at the interrupted threads so as to spring toward and bear with locking action upon the body of the complementary member between its threads, the locking portion having a cutting point formed at the intersection of a front transverse face and a convergent curved rear edge, the said portion forming a cutting contact upon the surface of the body of the complementary threaded part when relatively turned to separate the parts but permitting such movement upon application of force sufficient to overcome the cutting resistance.

4. The combination with a nut for a bolt or screw the nut having a countersunk portion or groove which interrupts its thread, of a removable key comprising a resilient shank adapted to be assembled in the countersunk portion or groove within the nut, and provided with sufficient space for automatic action and having a locking member, the face being substantially radial and having opposite the radial face of the locking member, a sharp convergent curve terminating in a sharp cutting contact point, and thus the curved portion of said locking member rides easily on the body of the bolt or screw, when being turned in one direction while the sharp cutting contact point of said locking member, by cutting action resists movement in the opposite direction but the removal of the nut from the bolt is accomplished substantially in the same manner as an ordinary nut is removed from a bolt, owing to the yielding movement of said shank, when a wrench is applied to the nut or screw with sufficient manual force.

5. The combination of a threaded member having a recess or groove, a portion of which interrupts a portion of the thread, and a means for locking said member as to a complementary threaded part, comprising a resilient key lying in said groove and attached at one end to said member and having on its other and yielding end a curved knife-edge locking portion, said edge convergently intersecting with a transverse face of said portion and forming therewith a cutting contact point adapted to bear upon the body surface of the said part between its threads, said portion substantially forming a part of the interrupted thread.

In testimony whereof I affix my signature.

WILLIAM DUDLEY LEE.

Copies of this patent may be obtained for five cents each, by addressing the "Commissioner of Patents, Washington, D. C."